United States Patent [19]

Gellert et al.

[11] 4,222,733
[45] Sep. 16, 1980

[54] INJECTION MOLDING FLOW CONTROL MECHANISM

[75] Inventors: Jobst U. Gellert; Peter Krause, both of Brampton, Canada

[73] Assignee: Mold-Masters Limited, Georgetown, Canada

[21] Appl. No.: 970,387

[22] Filed: Dec. 18, 1978

[30] Foreign Application Priority Data

Dec. 14, 1978 [CA] Canada ................................. 317947

[51] Int. Cl.³ .............................................. B29F 1/03
[52] U.S. Cl. .................................................. 425/566
[58] Field of Search ............... 425/562, 564, 565, 566; 308/2 R

[56] References Cited

U.S. PATENT DOCUMENTS

| 2,375,322 | 5/1945 | Pierce | 308/2 R |
| 2,914,361 | 11/1959 | Turner | 308/2 R |
| 4,053,271 | 10/1977 | Gellert | 425/562 |

FOREIGN PATENT DOCUMENTS 1029162  4/1978  Canada .

2615282 11/1976  Fed. Rep. of Germany ........... 425/566

Primary Examiner—Thomas P. Pavelko
Attorney, Agent, or Firm—George H. Riches & Associates

[57] ABSTRACT

This invention relates to improved flow control mechanism for valve gated injection molding. The mechanism is of the type where movement of the valve pin is controlled by a pneumatically driven rocker arm. The back plate is cast with an integral pivot pin portion projecting from it and a pivot ball is fixed in a seat on the end of it. The rocker arm has a recess which receives the pivot ball for pivotal motion on the pivot pin portion of the back plate. The back plate is cast of a steel with sufficient strength and flexibility to withstand the repeated lateral loading on it due to the pivotal motion of the rocker arm, while the pivot ball is formed of a significantly harder material to avoid unacceptable wear where it is in moving contact with the rocker arm. Casting the back plate rather than machining it, enables bends in the runner passage extending through it to be smoothly curved, thus avoiding "dead spots".

4 Claims, 2 Drawing Figures

INJECTION MOLDING FLOW CONTROL MECHANISM

BACKGROUND OF THE INVENTION

This invention relates to valve gated injection molding and more particularly to an improved injection molding flow control mechanism.

The flow of melt to the cavity in a valve gated injection molding system is controlled by actuating a valve pin to seat its tip in the gate. In injection molding systems of the type disclosed in Canadian Pat. No. 1,029,162 which issued Apr. 11, 1968, this is done by applying a force to the other end of the valve pin by a pneumatically driven pivotal rocker arm. The rocker arm was supported by a pin extending through a transverse hole in the rocker arm with its ends received in opposing slots in the back plate. This had the advantage of reduced wear over previous knife-edge type fulcrums, but had the disadvantage that the hole, pin and back plate had to be machined to very close tolerances. Furthermore, in some mold configurations it is necessary that the runner passage bend as it passes through the back plate in order to go around this rocker arm mechanism. It is very desirable in injection molding technology that no sharp bends or corners be provided in the runner passage in order to avoid dead spots where build up and decomposition of the melt may occur. However, in these previous machined back plates, the runner passage was necessarily formed by drilling which resulted in sharp corners where bends occured.

More recently, the problems of the rocker arm pivot have attempted to be overcome by pivotting the rocker arm on the rounded end of a pivot pin received in a hole in the back plate and extending perpendicularly to the axis of rotation of the rocker arm. While reducing the number of interconnections from the previous structure, this still has the disadvantage that a very close tolerance fit is required between the pivot pin and the back plate. Furthermore, it will be appreciated that the operation of the rocker arm exerts a very considerable lateral thrust on the pivot pin, and it has been found that pins of this type supported at one end only made of material hard enough to withstand wear on the rounded end to the extent required, are not able to withstand this continual back and forth flexing pressure for the long periods of time required without breaking.

SUMMARY OF THE INVENTION

Accordingly, it is an object of the present invention to at least partially overcome these disadvantages by providing a back plate which is cast rather than machined and which has an integral pivot pin which receives a pivot ball of a much harder material on its end.

To this end, in one of its aspects, the invention provides an injection molding flow control mechanism of the type wherein a valve pin is actuated by a pneumatically driven pivoted rocker arm, the rocker arm having a recess to receive a rounded fulcrum, the improvement comprising a cast steel back plate having an integral pivot pin portion projecting therefrom, the pivot pin portion defining a ball seat at its extended end, and a rounded pivot member formed of a material significantly harder than the material of the back plate, the pivot member adapted to be fixedly seated in said seat on the pivot pin portion, the rocker arm being located with the pivot member received in said recess whereby the rocker arm may be pivoted on the pivot pin portion of the back plate.

Further objects and advantages of the invention will appear from the following description taken together with the accompanying drawings.

DETAILED DESCRIPTION OF THE DRAWINGS

Figure 1:
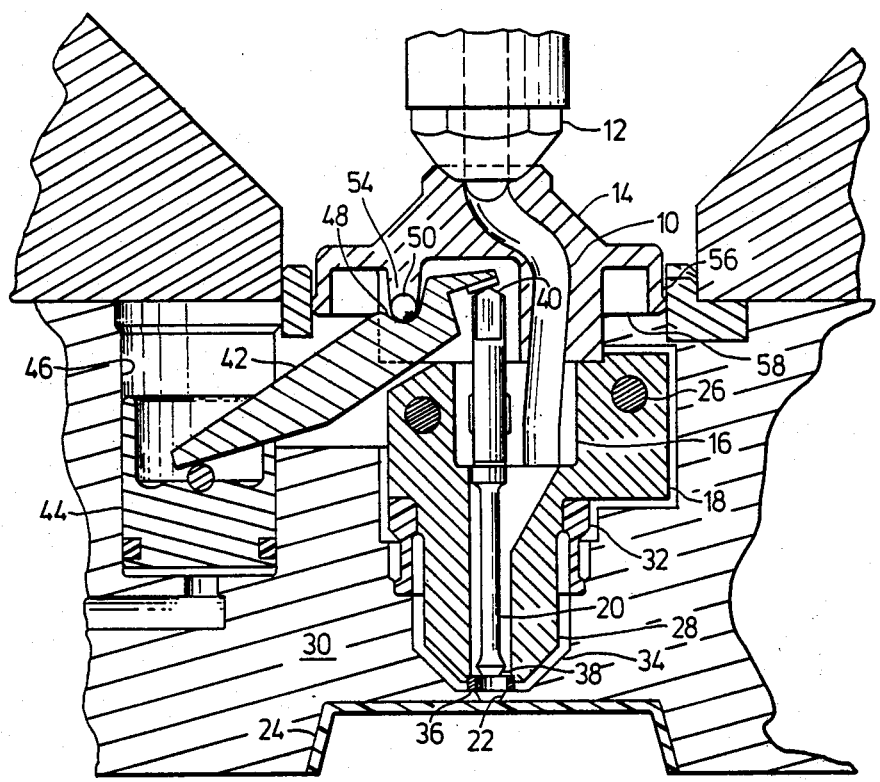
FIG. 1 is a partial sectional view of a preferred embodiment of the invention.

Reference is first made to FIG. 1 which shows an improved valve gated injection molding flow control mechanism. A hot runner passage 10 extends from the nozzle 12 of the molding machine, through the back plate 14, through the bushing seal 16 received in the heater cast 18, around the stem of the valve pin 20, through the gate 22 and into the cavity 24. The heater cast 18 is formed of beryllium copper and has an electrical heating element 26 and a nozzle portion 28. The heater cast 18 is positioned in the cavity plate 30 by insulation bushing 32 and is spaced from the cavity plate 30 by air gap 34. A nozzle seal 36 extends across the air gaps 34 adjacent the gate 26.

The valve pin 20 has a tip 38 which seats in gate 22 and an opposite driven end 40, and is actuated by rocker arm 42. The rocker arm 42 is driven by piston 44 which reciprocates in pneumatic cylinder 46. The rocker arm 42 has a concave recess 48 which receives a pivot ball 50, which in turn is fixed in concave seat 52 formed at the end of the pivot pin portion 54 of the back plate 14. The back plate 14 is cast with the integral pivot pin portion of a suitable material such as H 13 steel and the pivot ball 50 is formed of a significantly harder material such as solid carbide having a surface hardness of at least 70C Rockwell and then fixed in the seat 52 by brazing or some other suitable method. The portion of the runner passage 10 which extends through the back plate 14 must be curved or bent in this configuration to avoid the rocker arm and upper valve pin structure. As may clearly be seen in FIG. 1, the back plate 14 is cast to form the runner passage 10 with smooth curves to avoid any possibility of dead spots occuring where the melt will sit and decompose and also cause problems on color change.

Figure 2:
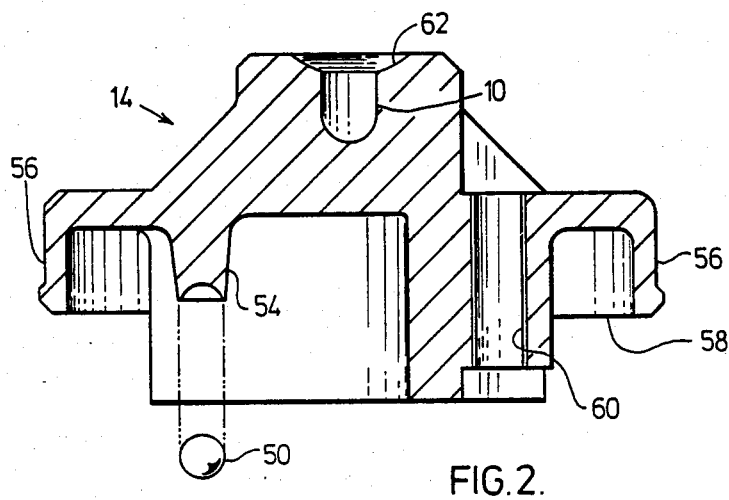
FIG. 2 is a sectional view of the back plate and pivot ball at ninety degrees to the view in FIG. 1.

As seen in FIG. 2, the back plate 14 has a lip 56 to locate it in the cavity plate 30 and a number of radial ribs 58 are provided for additional strength in receiving the force from the molding machine. A tapped bore 60 is also provided to receive a setscrew (not shown) over a thermocouple connection coming in from the side. The back plate 14 is also, of course, slightly recessed at 62 to receive the nozzle 12 of the molding machine.

In use, with the valve pin 20 in the open position shown, pressurized melt flows from the molding machine, through the runner passage 10, and into the cavity 24. When the cavity 24 is full, the piston 44 is pneumatically actuated in the cylinder 46 by control valves (not shown) which causes the rocker arm 42 to pivot. This, in turn, applies a force to the driven end 40 of the valve pin 20 to move it to the closed position with the valve pin tip 38 seated in the gate 22. The mold is then opened along the parting line, the molded part ejected, and then closed again. The cylinder is then returned to its original position, which removes the force from the driven end 40 of the valve pin 20 and allows the valve pin to return to the open position under the pressure of the melt in the runner passage 10, which then again flows into the cavity 24. This process in repeated at speeds up to about twenty times per minute and each time the rocker arm 42 pivots it exerts a lateral force on the pivot pin portion 54 of the back plate 14. As mentioned above, it has been found that this repeated loading leads to failure of the pivot pin portion if it is formed of a material which is too hard and brittle. On the other hand, a hard material is required where contact is made with the rocker arm in order to avoid unacceptable wear. These conflicting requirements are met in the present invention by casting the back plate 14 of softer steel and then fixing the pivot ball 50 of much harder material thereto. This provides the pivot pin portion with sufficient strength and flexibility to withstand the repeated lateral loading, and at the same time avoids unacceptable wear of the surface of the pivot ball where it is in moving contact with the rocker arm.

Although this invention has been described in respect to a particular embodiment, it is not to be construed in a limiting sense. Variations and modifications will now occur to those skilled in the art.

What I claim is:

1. In injection molding flow control mechanism of the type wherein a valve pin is actuated by a pneumatically driven pivoted rocker arm, the rocker arm having a concave recess to receive a convex fulcrum, the improvement comprising;
   (a) a cast steel back place having an integral pivot pin portion projecting therefrom, the pivot pin portion defining a concave seat at its extended end, and
   (b) a spherical pivot member formed of a material significantly harder than the material of the back plate, the pivot member adapted to be fixedly seated in said seat on the pivot pin portion, the rocker arm being located with the pivot member received in said recess whereby the rocker arm may be pivoted on the pivot pin portion of the back plate.

2. Mechanism as claimed in claim 1 wherein the back plate is cast to have a smoothly curved runner passage extending therethrough.

3. Mechanism as claimed in claim 1 wherein the pivot member has a hardness of at least 70C Rockwell.

4. Mechanism as claimed in claim 1 wherein the pivot member is a ball.